July 31, 1928.
C. SCHAER
1,678,956
INTERNAL COMBUSTION ENGINE
Filed Sept. 9, 1925
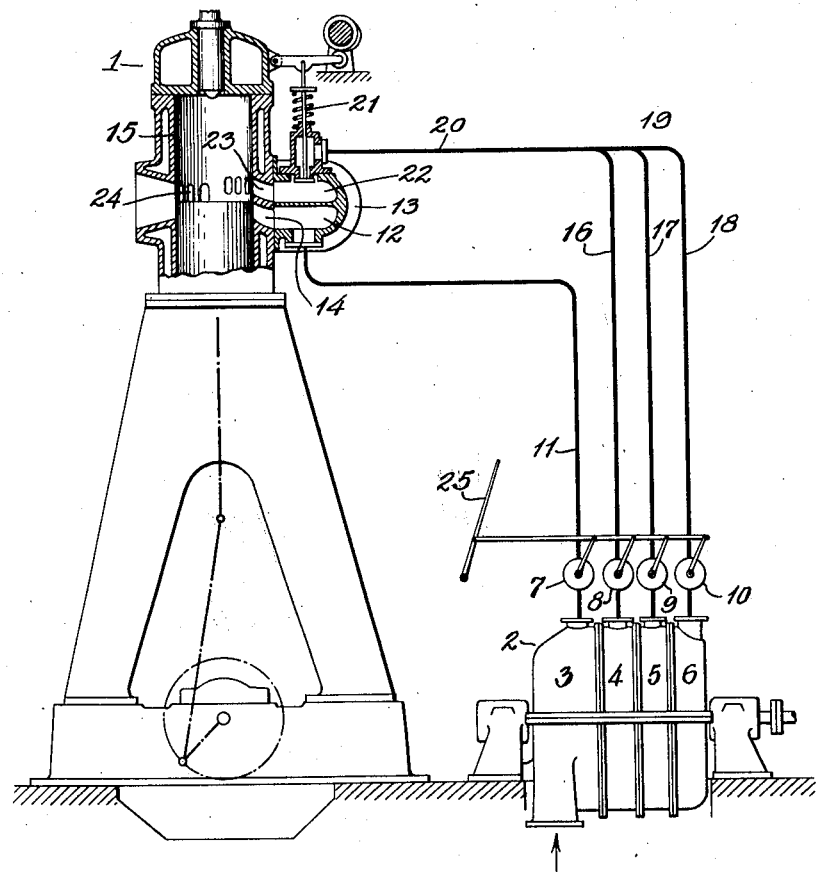
INVENTOR
Charles Schaer
ATTORNEYS Patented July 31, 1928.

1,678,956

UNITED STATES PATENT OFFICE.

CHARLES SCHAER, OF LANGENTHAL, SWITZERLAND, ASSIGNOR TO BUSCH-SULZER BROS.-DIESEL ENGINE COMPANY, OF ST. LOUIS, MISSOURI, A CORPORATION OF MISSOURI.

INTERNAL-COMBUSTION ENGINE.

Application filed September 9, 1925, Serial No. 55,232, and in Germany September 23, 1924.

The invention relates to injection type two-cycle oil engines, wherein the scavenging air is supplied by a blower and auxiliary air is desired for assisting the scavenging or affording a super-charging effect. The object of the invention, among other things, is to provide a greater accommodation of the air supply to the varying work of the engine.

In the accompanying drawing forming part hereof a two-cycle engine is conventionally illustrated by the reference 1, the cylinder head whereof will be understood to be adapted to contain an injector device for the fuel, such injector being operated at or about compression dead center, as customary, and serving to deliver variable charges of fuel into the body of compressed air in the clearance space of the cylinder. When the piston is at the end of its downward stroke the combustion products escape through the exhaust port 24 and scavenging air enters the cylinder from the receiver 12 through the scavenger air ports 14. As the piston ascends on its compression stroke further air is admitted from the receiver 22 through the ports 23. This auxiliary or super-charging air may be at considerably higher pressure than the scavenging air in the receiver 12 and its flow to the cylinder is controlled by the valve 21 operated by a suitable cam as will be understood.

The air for delivery to the engine through both sets of air ports is derived, according to this invention, from a multi-stage blower or rotary compressor 2 of which the lower stage 3 supplies air of moderate pressure through a pipe, diagrammatically indicated at 11, to the receiver 12. The successive stages, marked 4, 5, and 6, are arranged to supply air at successively higher pressures through pipes diagrammatically indicated at 16, 17 and 18 to the pipe 20 and thence through the valve 21 to the super-charging receiver 22.

The pipes from the successive stages of the blower are respectively provided with control valves diagrammatically indicated at 7, 8, 9 and 10, and these are preferably, though not necessarily, connected together by a common connecting rod or the equivalent for operation by a handle or lever 25 so that air may be delivered to the super-charging receiver successively from any one of the stages of the compressor, as circumstances may require. This lever 25 may, if desired, be connected by appropriate linkage to the usual fuel injection regulating lever, not shown, so that the degree of super-charging may thus be automatically kept in a predetermined relation to the amount of fuel in the injected charge. It will be understood, of course, that the lowest stage of the blower will, in all valve adjustments, supply the necessary scavenging air to the receiver 12 such stage being of larger capacity than necessary for supplying the scavinging air alone. The excess air not delivered to the receiver 12 from the lowest stage, passes to the next higher stage of the compressor and so on, as customary in multi-stage rotary compressors. For each setting of the lever or control member 25 one of the higher stages is connected to the receiver 22, preferably successively, so that an approximately correct pressure for every working condition is thus available the highest pressure being the result of compression of all the stages. The blower 2 is driven by any suitable connection to an auxiliary prime mover electric motor or otherwise.

I claim:

1. The combination with a two-cycle injection engine having means for admitting scavenging and auxiliary air thereto, of a multi-stage rotary compressor for supplying such air, the lower stage of such compressor serving to supply the scavenging air and the higher stages thereof serving to supply super-charging air at variably selected pressures.

2. The combination with a two-cycle injection engine having means for admitting scavenging air and means for admitting auxiliary air, of a multi-stage blower, a connection between the lowest stage of the blower and the means for admitting scavenging air, connections between the higher stages of the blower and the means for admitting auxiliary air, and means for varying the scavenging and auxiliary air flow through said connections as the power demands may require.

3. In a two-cycle injection engine the method of supplying scavenging and auxiliary air thereto which consists in introducing the scavenging air into the cylinder from the lower stage of a multi-stage rotary compressor and connecting one or more of the higher stages of the compressor with the cylinder to supply said auxiliary air.

In testimony whereof, I have signed this specification.

CHARLES SCHAER.